US012468952B2

(12) United States Patent
Li et al.

(10) Patent No.: US 12,468,952 B2
(45) Date of Patent: Nov. 11, 2025

(54) SYSTEMS AND METHODS FOR NOISE-ROBUST CONTRASTIVE LEARNING

(71) Applicant: Salesforce, Inc., San Francisco, CA (US)

(72) Inventors: Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 1022 days.

(21) Appl. No.: 17/015,858

(22) Filed: Sep. 9, 2020

(65) Prior Publication Data
US 2021/0374553 A1 Dec. 2, 2021

Related U.S. Application Data

(60) Provisional application No. 63/033,547, filed on Jun. 2, 2020.

(51) Int. Cl.
*G06N 3/088* (2023.01)
*G06N 3/045* (2023.01)

(52) U.S. Cl.
CPC .............. *G06N 3/088* (2013.01); *G06N 3/045* (2023.01)

(58) Field of Classification Search
CPC ............................... G06N 3/088; G06N 3/045
USPC ........................................................ 706/20
See application file for complete search history.

(56) References Cited

U.S. PATENT DOCUMENTS

| | | | |
|---|---|---|---|
| 10,185,895 B1 * | 1/2019 | Tse | G06V 20/41 |
| 10,360,665 B2 * | 7/2019 | Gupta | G06N 3/045 |
| 2010/0318499 A1 * | 12/2010 | Arasu | G06F 16/215 |
| | | | 707/693 |
| 2017/0228641 A1 * | 8/2017 | Sohn | G06F 17/11 |
| 2018/0124423 A1 * | 5/2018 | Choi | G06V 10/82 |
| 2019/0066268 A1 * | 2/2019 | Song | G06N 3/048 |
| 2020/0097742 A1 * | 3/2020 | Ratnesh Kumar | G06V 20/52 |
| 2020/0380304 A1 * | 12/2020 | Sallee | G06T 7/136 |

OTHER PUBLICATIONS

Tseng et al, 2015, "Simultaneous Deep Transfer Across Domains and Tasks" (Year: 2015).*

(Continued)

*Primary Examiner* — Abdullah Al Kawsar
*Assistant Examiner* — Jun Kwon
(74) *Attorney, Agent, or Firm* — Haynes and Boone, LLP

(57) ABSTRACT

Embodiments described herein provide systems and methods for noise-robust contrastive learning. In view of the need for a noise-robust learning system, embodiments described herein provides a contrastive learning mechanism that combats noise by learning robust representations of the noisy data samples. Specifically, the training images are projected into a low-dimensional subspace, and the geometric structure of the subspace is regularized with: (1) a consistency contrastive loss that enforces images with perturbations to have similar embeddings; and (2) a prototypical contrastive loss augmented with a predetermined learning principle, which encourages the embedding for a linearly-interpolated input to have the same linear relationship with respect to the class prototypes. The low-dimensional embeddings are also trained to reconstruct the high-dimensional features, which preserves the learned information and regularizes the classifier.

10 Claims, 11 Drawing Sheets

(56) References Cited

OTHER PUBLICATIONS

Chen, 2019, "Image Deformation Meta-Networks for One-Shot Learning" (Year: 2019).*
Guo, Apr. 2020, "Nonlinear Mixup: Out-of-Manifold Data Augmentation for Text Classification" (Year: 2020).*
Yang et al, 2018, "Robust Classification with Convolutional Prototype Learning" (Year: 2018).*
Deng et al, 2014, "Equidistant prototypes embedding for single sample based face recognition with generic learning and incremental learning" (Year: 2014).*
Berthelot et al, Feb. 2020, "Remixmatch: Semi-Supervised Learning With Distribution Alignment and Augmentation Anchoring" (Year: 2020).*
Wang et al, 2018, "Iterative Learning with Open-set Noisy Labels" (Year: 2018).*
Kim et al, "Variational Prototyping-Encoder: One-Shot Learning with Prototypical Images", 2019 (Year: 2019).*

* cited by examiner

Algorithm 1: Noise-Robust Contrastive Learning.

Input: noisy training data $\mathcal{D} = \{(x_i, y_i)\}_{i=1}^n$, model parameters $\theta$.

1. for $t \leftarrow 0$ to $t_0 - 1$ do  // learn from noisy labels for $t_0$ epochs (warm-up)
2.   $\{\tilde{z}_i\}_{i=1}^n = \{f_\theta(x_i)\}_{i=1}^n$
3.   // get normalized low-dimensional embeddings for all center-cropped images
4.   $\{\bar{z}^c\}_{c=1}^C$ = Calculate-Prototype($\{\tilde{z}_i, y_i\}_{i=1}^n$)
5.   // calculate class prototypes as normalized mean embeddings
6.   for $\{(x_i, y_i)\}_{i=1}^{2b}$ in $\mathcal{D}$ do  // load a minibatch with weak and strong augmentations
7.     $\tilde{z}_i = f_\theta(x_i)$  // obtain normalized low-dimensional embeddings
8.     $\lambda \sim \text{Beta}(\alpha, \alpha)$  // sample a mixup weight from a beta distribution
9.     $x_i^m = \lambda x_i + (1-\lambda) x_{m(i)}$  // generate virtual training samples
10.    $\tilde{z}_i^m = f_\theta(x_i^m)$  // obtain embeddings for virtual samples
11.    $\mathcal{L} = \sum_{i=1}^{b} \mathcal{L}_{ce}(x_i, y_i) + \sum_{i=1}^{2b} (\omega_{cc} \mathcal{L}_{cc}(\tilde{z}_i) + \omega_{pc\_mix} \mathcal{L}_{pc\_mix}(\tilde{z}_i^m, y_i, \lambda) + \omega_{rcon} \mathcal{L}_{rcon}(x_i, \tilde{z}_i))$
12.    $\theta = \text{SGD}(\mathcal{L}, \theta)$  // update model parameters
13.  end
14. end
15. for $t \leftarrow t_0$ to MaxEpoch do  // learn from pseudo-labels
16.   $\{\tilde{z}_i, p_i^t\}_{i=1}^n = \{f_\theta(x_i)\}_{i=1}^n$
17.   // get embeddings and softmax predictions for all center-cropped images
18.   $q_i^t = (p_i^t + s_{knn}(\tilde{z}_i, \{\tilde{z}_j, q_j^{t-1}\}_{j=1}^n))/2, \quad q_i^{t_0-1} = p_i^{t_0}$
19.   // aggregate information from neighbors to generate soft pseudo-labels
20.   $\mathcal{D}_{sup}^t = \{(x_i, \hat{y}_i^t)\} = \text{Confidence-Select}(\{(q_i^t, y_i)\}_{i=1}^n, \eta_0, \eta_1)$
21.   // select a subset with confident soft labels and convert to hard labels
22.   Repeat line 4-12, but replace $y_i$ with $\hat{y}_i^t$, and only use samples from $\mathcal{D}_{sup}^t$ to compute $\bar{z}^c, \mathcal{L}_{ce}, \mathcal{L}_{pc\_mix}$.
23. end

*FIG. 4*

| Dataset | CIFAR-10 | | | CIFAR-100 | |
| --- | --- | --- | --- | --- | --- |
| Noise type | Sym 20% | Sym 50% | Asym 40% | Sym 20% | Sym 50% |
| Cross-Entropy | 82.7 | 57.9 | 72.3 | 61.8 | 37.3 |
| Forward | 83.1 | 59.4 | 83.1 | 61.4 | 37.3 |
| Co-teaching+ | 88.2 | 84.1 | - | 64.1 | 45.3 |
| Mixup | 92.3 | 77.6 | - | 66.0 | 46.6 |
| P-correction | 92.0 | 88.7 | 88.1 | 68.1 | 56.4 |
| MLNT | 92.0 | 88.8 | 88.6 | 67.7 | 58.0 |
| M-correction | 93.8 | 91.9 | 86.3 | 73.4 | 65.4 |
| DivideMix | 95.0 | 93.7 | 91.4 | 74.8 | 72.1 |
| DivideMix | 95.1±0.1 | 93.6±0.2 | 91.3±0.8 | 75.1±0.2 | 72.1±0.3 |
| Ours (classifier) | 95.8±0.1 | 94.3±0.2 | 91.9±0.8 | 79.1±0.1 | 74.8±0.4 |
| Ours (knn) | 95.9±0.1 | 94.5±0.1 | 92.4±0.9 | 79.4±0.1 | 75.0±0.4 |

| CIFAR-10 Sym 50% | CE | Iterative | GCE | DivideMix | Proposed Cls. | Proposed knn |
| --- | --- | --- | --- | --- | --- | --- |
| + CIFAR-100 20k | 53.6 | 87.2 | 87.3 | 89.0 | 91.5 | 93.1±0.3 |
| + SVHN 20k | 58.1 | 88.6 | 88.8 | 91.9 | 93.3 | 93.9±0.2 |
| + Image Corruption | 53.8 | 87.7 | 87.9 | 89.8 | 91.4 | 91.6±0.2 |

| Test dataset | WebVision | | ILSVRC12 | |
|---|---|---|---|---|
| Accuracy (%) | top1 | top5 | top1 | top5 |
| Forward | 61.1 | 82.7 | 57.4 | 82.4 |
| Decoupling | 62.5 | 84.7 | 58.3 | 82.3 |
| D2L | 62.7 | 84.0 | 57.8 | 81.4 |
| MentorNet | 63.0 | 81.4 | 57.8 | 79.9 |
| Co-teaching | 63.6 | 85.2 | 61.5 | 84.7 |
| INCV | 65.2 | 85.3 | 61.0 | 85.0 |
| DivideMix | 75.9 | 90.1 | 73.3 | 89.2 |
| Pro. (no label correction) | 75.5 | 90.2 | 72.0 | 90.0 |
| Pro (classifier) | 76.3 | 91.5 | 73.3 | 91.2 |
| Pro (knn) | 77.8 | 91.3 | 74.4 | 90.9 |

FIG. 11

| Method | CE | Forward | Joint-Opt | MLNT | SL | DivideMix | Proposed (cls.) | Proposed(knn) |
|---|---|---|---|---|---|---|---|---|
| Accuracy | 69.21 | 69.84 | 72.16 | 73.47 | 74.45 | 74.48 | 74.84 | 74.97 |

FIG. 12

| without $\mathcal{L}_{recon}$ | CIFAR-10 Sym 50% | + CIFAR-100 20k | + Image Corruption | CIFAR-100 Sym 50% |
|---|---|---|---|---|
| classifier | −1.0 | −0.8 | −1.2 | −1.6 |
| knn | −0.5 | −0.2 | −0.6 | −1.1 |

FIG. 13

| bottleneck dimension | $d = 25$ | $d = 50$ | $d = 100$ | $d = 200$ |
|---|---|---|---|---|
| CIFAR-10 Sym 50% | 93.4 | 94.3 | 94.2 | 93.7 |
| CIFAR-100 Sym 50% | 73.8 | 74.8 | 74.4 | 73.8 |

FIG. 14

SYSTEMS AND METHODS FOR NOISE-ROBUST CONTRASTIVE LEARNING

CROSS-REFERENCES

The present disclosure is a nonprovisional application of and claims priority under 35 U.S.C. 119 to U.S. provisional application No. 63/033,547, filed on Jun. 2, 2020, which is hereby expressly incorporated by reference herein in its entirety.

TECHNICAL FIELD

The present disclosure relates generally to training and use of machine learning systems and more specifically noise-robust contrastive learning with data samples having noisy labels.

BACKGROUND

Neural networks have demonstrated great promise as a technique for automatically analyzing real-world information with human-like accuracy. For example, a neural network classifier may predict a class of the input information among a predetermined set of classes, e.g., identifying that a photo of a fruit orange belongs to the class "orange." To achieve this, neural networks learn to make predictions gradually, by a process of trial and error, using a machine learning process. A given neural network model may be trained using a large number of training examples, proceeding iteratively until the neural network model begins to consistently make similar inferences from the training examples that a human may make.

For example, deep neural networks (DNNs) are mostly trained on clean datasets with high-quality human annotations. However, manual data cleaning and labeling can be labor-intensive and expensive, thus difficult to scale. Real-world noisy images from the Internet may provide a large amount of noisy training data, e.g., an image using captions captured from a website as its noisy label. Such training data can often be "noisy" because the label is not humanly reviewed and/or annotated and can often be inaccurate. One example can be that a photo of TV show "Orange is the new black" is labeled as belonging to class "orange" that is related to a type of fruits, which is an inaccurate label for the content of the photo. DNNs are susceptible to overfitting to noise, rendering learning from noisy data to result in poor performance of the DNN.

Therefore, there is a need for noise-robust learning with noisy data.

BRIEF DESCRIPTION OF THE DRAWINGS

FIG. 4 provides an example diagram illustrating pseudo-code of the noise-robust contrastive learning together with label correction as implemented by the neural network in FIG. 1, the architecture in FIG. 2, or the noise-robust contrastive learning module in FIG. 3, according to one embodiment described herein.

FIGS. 11-12 provide data tables showing example performance with existing methods real-world noisy data, according to one embodiment described herein, according to one embodiment described herein.

FIGS. 13-14 provide data tables showing example ablation study, according to one embodiment described herein.

Figure 1:
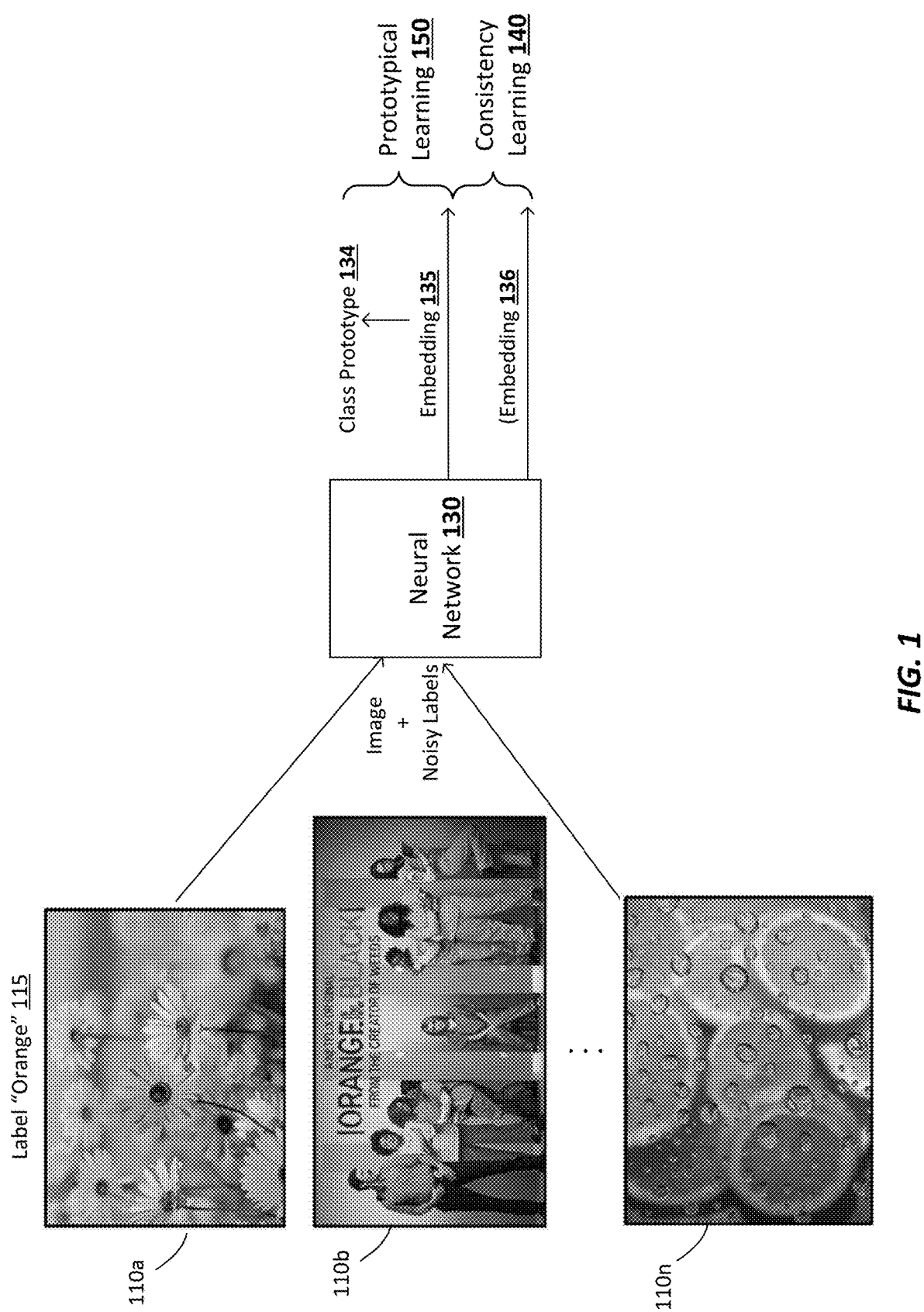
FIG. 1 provides an example diagram illustrating an aspect of training with noisy data, according to an embodiment described herein.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

Training datasets for neural networks can sometimes be "noisy," e.g., images downloaded from the Internet using captions captured from a website as its noisy label. The label is not humanly reviewed and/or annotated and can often be inaccurate. As used herein, the term "label noise" is used to refer to data samples that are wrongly labeled as another class. For example, an image of sunflowers having the color of orange is labeled as the class "orange" that is related to a type of fruit. As used herein, the term "out-of-distribution" (OOD) input is used to refer to data samples that do not belong to any known classes. For example, an image of a poster for TV show "Orange is the New Black" can be an OOD sample when the known or pre-defined classes are all related to different types of fruits. As used herein, the term "input corruption" is used to refer to image-level distortion (e.g. low brightness or resolution) that causes a data shift between training and test.

Existing systems on learning from noisy labels usually focus on addressing the more detrimental label noise. For example, an existing label noise learning approach finds clean samples as those with smaller loss and assign larger weights to them, while other learning approaches relabel noisy samples using predictions generated by a model. These approaches that focus on addressing label noise do not consider out-of-distribution input or input corruption, which limits their performance in real-world scenarios. In addition, using the prediction from a neural model itself to relabel samples may cause confirmation bias, where the prediction error accumulates and harms performance.

In view of the need for a noise-robust learning system, embodiments described herein provides a contrastive learning mechanism that combats noise by learning robust representations of the noisy data samples. Specifically, the training images are projected into a low-dimensional subspace, and the geometric structure of the subspace is regularized with: (1) a consistency contrastive loss that enforces images with perturbations to have similar embeddings; and (2) a prototypical contrastive loss augmented with a predetermined learning principle, which encourages the embedding for a linearly-interpolated input to have the same linear relationship with respect to the class prototypes. The low-dimensional embeddings are also trained to reconstruct the high-dimensional features, which preserves the learned information and regularizes the classifier.

In some embodiments, virtual training samples may be constructed as linear interpolation of inputs and encourage the same linear relationship with respect to the class prototypes.

In some embodiments, a linear autoencoder is trained to reconstruct the high-dimensional features using low-dimensional embeddings, which learns a subspace that approximates the principal subspace as acquired by principle component analysis (PCA). In this way, knowledge learned from the proposed contrastive losses can be maximally preserved in the high-dimensional features and regularizes the classifier.

In some embodiments, an iterative label correction may be implemented. For example, for each sample, information from the neighbors of the respective sample may be aggregated to create a pseudo-label. A subset of training samples with confident pseudo-labels are then selected to compute the supervised losses. This process can clean both label noise and OOD noise.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks, such as supervised or unsupervised neural networks, convolutional neural networks, or memory-augmented neural networks, among others.

Overview

FIG. 1 provides an example diagram illustrating an aspect of training with noisy data, according to an embodiment described herein. Training datasets of real-world images can often contain different types of noise. For example, training images 110a-n may be labeled as belonging to the class "orange," which may be derived from keywords accompanying the image. Image 110a contains sunflowers of the orange color and therefore the false label "orange" is a label noise. Image 110b shows a poster for the TV show "Orange is the new black," which may be an OOD sample as the image 110b does not belong to any known classes of objects. Image 110n contains a visual of sliced oranges but the resolution is low and the image is disturbed by splashed water drops, which constitutes input corruption of the image sample 110n.

The training images 110a-n with its noisy label "orange" may all be input to a neural network 130. The neural network 130 may project the training images 110a-n to a low-dimensional subspace, e.g., by generating a "weak" normalized embedding 135 from a weakly augmented image sample and a "strong" normalized embedding 136 from a strongly augmented image sample from the same training image sample. For example, weak augmentation of an image sample may include any of flipping, cropping, enhancement, and/or the like of the image. Strong augmentation of an image sample may include color change, center cropping, and/or the like of an image.

The neural network 130 may then project noisy training image samples into a low-dimensional subspace and implement contrastive learning to regularize the geometric structure of the low-dimensional subspace through at least two ways. On one hand, for consistency learning, the "strong" embedding 136 and the "weak" embedding 135 of the same image sample are compared to generate an unsupervised consistency loss for consistency learning 140, which is minimized to increase the consistency of neural network performance. The unsupervised contrastive consistency loss enforces inputs with perturbations to have similar normalized embeddings (e.g., 135, 136), which helps the neural network 130 to learn robust and discriminative representation. On the other hand, for prototypical learning 150, the low-dimensional embedding 135 of each training image is used to compute class prototypes 134 as normalized mean embeddings. A supervised prototypical loss is computed by comparing the class prototype 134 with a normalized embedding 135, which is minimized such that the neural network is trained to push images that belong to the same class to the class prototype in the low-dimensional subspace, while pulling images that belong to different classes away from the class prototype. The supervised prototypical loss enforces the normalized embedding of a sample to be closer to its class prototype that represents average characteristics of a class in the low-dimensional subspace.

In this way, the neural network 130 may achieve noise-robust learning during training, For example, even trained with data samples of noisy labels, the neural network 130 learns to predict a class label of an input image with significant accuracy that the class prototype corresponding to predicted class label is the closest among all class prototypes to the embedding of the input image, and with consistency that the same predicted class label can be generated for the same source image.

Figure 2:
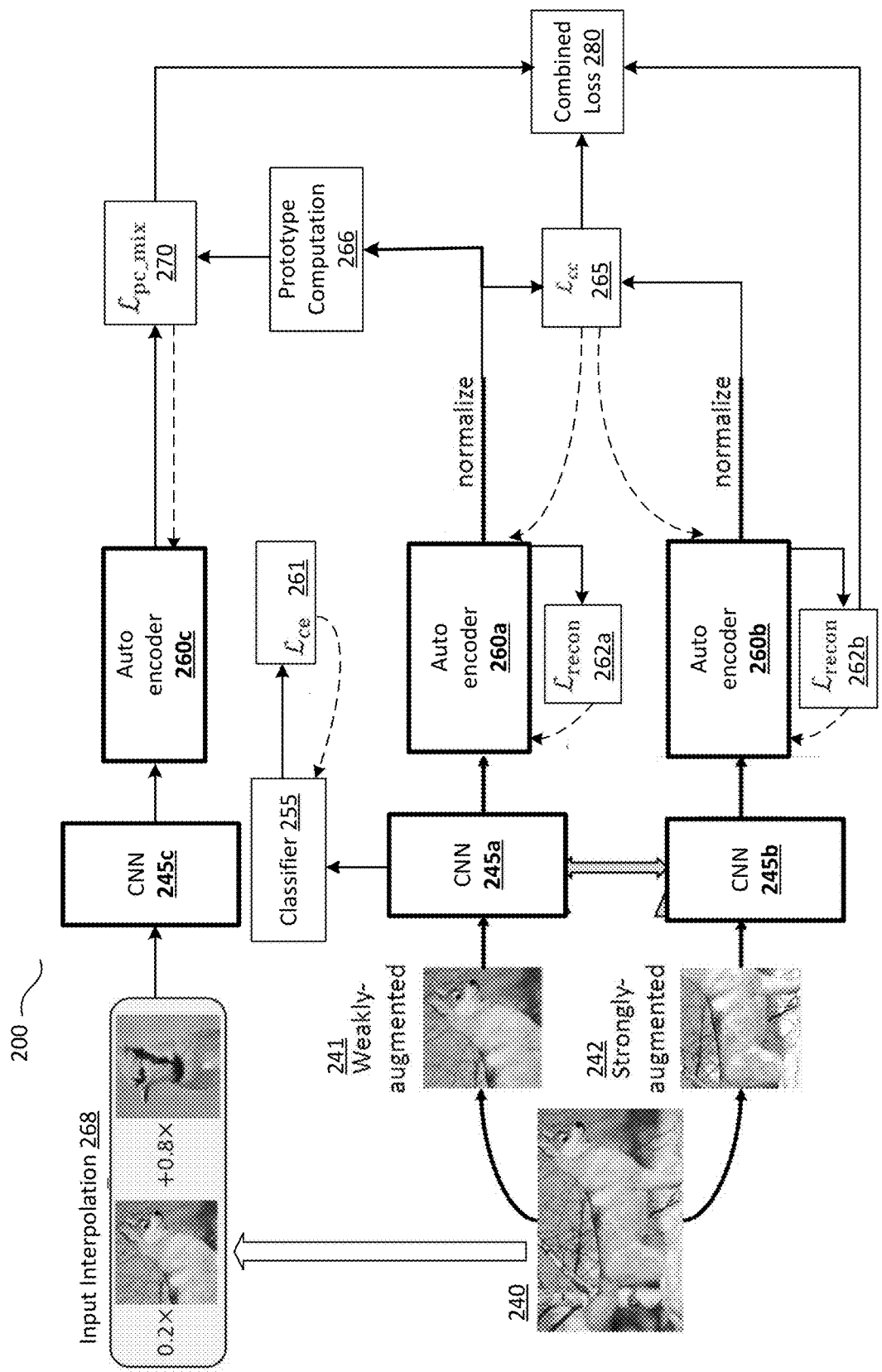
FIG. 2 is a simplified diagram illustrating an example architecture of the neural network for noise-robust contrastive learning shown in FIG. 1, according to embodiments described herein.

FIG. 2 is a simplified diagram illustrating an example architecture of the neural network for noise-robust contrastive learning shown in FIG. 1, according to embodiments described herein. Diagram 200 shows that an input data sample 240, similar to one of the images 110a-n with a noisy label shown in FIG. 1, is used for noise-robust contrastive learning. The input data sample 240 may be taken from a noisy training dataset $\mathcal{D}=\{(x_i, y_i)\}$, where $x_i$ is an image and $y_i \in \{1, \ldots, C\}$ is its class label.

The input data sample 240 may be augmented to result in a weakly augmented sample 241, e.g., through flipping, cropping, enhancement, and/or the like, and in a strongly augmented sample 242, e.g., through color change, center cropping, and/or the like. In one implementation, one or more input data samples may further be interpolated by taking a linear combination of the weighted data samples. The weakly augmented data sample 241, the strongly augmented data sample 242 and/or the input interpolation 268 may each be input to the neural network 130 shown in FIG. 1.

The neural network 130 includes at least three components: (1) a deep encoder, e.g., a convolutional neural network (CNN) 245a-c (or collectively referred to as 245)

that encodes an image $x_i$ or an augmented sample of image $x_i$ to a high-dimensional feature $v_i$; (2) a classifier 255 (e.g., a fully-connected layer followed by softmax) that receives $v_i$ as input and outputs class predictions; (3) a linear autoencoder 260*a-c* (or collectively referred to as 260) that projects $v_i$ into a low-dimensional embedding $z_i \in \mathbb{R}^d$. Diagram 200 shows that the weakly augmented data sample 241 is input to CNN 245*a*, the strongly augmented data sample 242 is input to CNN 245*b* and the interpolated input 268 is input to CNN 245*c*, concurrently, alternately, or in any other manner. CNN 245*a-c* may share the same set of parameters or may be a copy or duplicate that each receives and processes different input data 241, 242 and 268 in parallel. Same arrangements may apply to autoencoders 260*a-c* as well.

In one embodiment, the weakly-augmented data sample 241 and the strongly-augmented data sample 242 may be used for consistency contrastive learning, which enforces images with semantic-preserving perturbations (e.g., weak or strong augmentation) to have similar embeddings. Specifically, given a minibatch of b images, weak-augmentation and strong-augmentation may be applied to each image, resulting in 2b inputs $\{x_i\}_{i=1}^{2b}$. Weak augmentation 241 may be a standard flip-and-shift augmentation strategy, while strong augmentation 242 consists of color or brightness changes, center cropping, etc.

The weakly-augmented data sample 241 and the strongly-augmented data sample 242 are each input to the CNN 245*a* or 245*b*, respectively, each of which encodes the augmented input into a high-dimensional feature $v_i$, respectively. The high-dimensional features from the CNN 245*a-b* are then input to the autoencoders 260*a-b*, respectively, each of which performs $z_i = W_e v_i$ the linear projection from high-dimensional features to low-dimensional embeddings. The low-dimensional embedding from the autoencoder 260 is normalized as $\hat{z}_i = z_i / \|z_i\|_2$, the normalized embeddings.

Thus, normalized embeddings $\{\hat{z}_i\}_{i=1}^{2b}$ are obtained from autoencoders 260*a-b* based on the 2b inputs $\{x_i\}_{i=1}^{2b}$. Let $i \in \{1, \ldots, b\}$ be the index of a weakly-augmented input 241, and j(i) be the index of the strongly-augmented input 242 from the same source image, the consistency contrastive loss can be computed at 265 by comparing the normalized embeddings from autoencoders 260*a-b*, defined as:

$$\mathcal{L}_{cc} = \sum_{i=1}^{b} -\log \frac{\exp(\hat{z}_i \cdot \hat{z}_{j(i)}/\tau)}{\sum_{k=1}^{2b} \mathbb{1}_{i \neq k} \exp(\hat{z} \cdot \hat{z}_k/\tau)}, \quad \text{Eq. (1)}$$

where $\tau$ is a scalar temperature parameter. The consistency contrastive loss maximizes the inner product between the pair of positive embeddings $\hat{z}_i$ and $\hat{z}_{j(i)}$ corresponding to the same source image, while minimizing the inner product between 2(b−1) pairs of negative embeddings corresponding to different images. By mapping different views (augmentations) of the same image to neighboring embeddings, the consistency contrastive loss encourages the neural network 130 to learn discriminative representation that is robust to low-level image corruption. In one implementation, the consistency contrastive loss 265 may be used to update the autoencoder 260*a-b* and the CNN 245*a-b*, e.g., through the backpropagation path illustrated in the dashed line from block 265.

In one embodiment, the normalized embedding $\hat{z}_i$ may be further used for prototypical contrastive learning, which injects structural knowledge of classes into the embedding space. Let $\mathcal{I}_c$ denote indices for the subset of images in $\mathcal{D}$ labeled with class c. The normalized embeddings are output from the autoencoder 260*a* to the prototype computation module 266, which computes a class prototype as the normalized mean embedding:

$$z^c = \frac{1}{|\mathcal{I}_c|} \sum_{i \in \mathcal{I}_c} \hat{z}_i, \quad \text{Eq. (2)}$$

$$\hat{z}^c = \frac{z^c}{\|z^c\|_2},$$

where $\hat{z}_i$ is the normalized embedding of a center-cropped image, and the class prototypes are calculated at the beginning of each epoch. The prototypical contrastive loss enforces an image embedding $\hat{z}_i$ to be more similar to its corresponding class prototype $\hat{z}^{y_i}$, in contrast to other class prototypes:

$$\mathcal{L}_{pc}(\hat{z}_i, y_i) = -\log \frac{\exp(\hat{z}_i \cdot \hat{z}^{y_i}/\tau)}{\sum_{c=1}^{C} \exp(\hat{z}_i \cdot \hat{z}^c/\tau)}, \quad \text{Eq. (3)}$$

In some embodiments, instead of using the normalized embedding of an augmented sample for prototypical contrastive learning, the interpolated input 268 may be used. Specifically, as the label $y_i$ is noisy, the encoder CNN 245 may be regularized from memorizing training labels, by creating virtual training samples by linearly interpolating a sample (indexed by i) with another sample (indexed by m(i)) randomly chosen from the same minibatch. For example, the input interpolation 268 may be defined as:

$$x_i^m = \lambda x_i + (1-\kappa)x_{m(i)}, \quad \text{Eq. (4)}$$

where $\lambda \sim \text{Beta}(\alpha, \alpha)$.

The interpolated sample $x_i^m$ is then fed to the CNN 245*c*, which generate a high-dimensional representation of $x_i^m$, and the high-dimensional representation is in turn projected to the low-dimensional subspace and normalized by the autoencoder 260*c*. Let $\hat{z}_i^m$ be the normalized embedding for $x_i^m$, the predetermined learning principle version of the prototypical contrastive loss can then be defined as a weighted combination of two $\mathcal{L}_{pc}$ with respect to class $y_i$ and $y_{m(i)}$. Thus, the prototypical contrastive loss module 270 may obtain the class prototypes from the prototype computation module 266 and compute the prototypical contrastive loss as:

$$\mathcal{L}_{pc\_mix} = \sum_{k=1}^{2b} \lambda \mathcal{L}_{pc}(\hat{z}_i^m, y_i) + (1-\lambda)\mathcal{L}_{pc}(\hat{z}_i^m, y_{m(i)}), \quad \text{Eq. (5)}$$

In one implementation, the $\mathcal{L}_{pc\_mix}$ may be used to update the autoencoder 260*c* and CNN 245*c*, e.g., via the backpropagation path shown in dashed line starting from block 270.

In one embodiment, a linear decoder $W_d$ (not shown in FIG. 2) may be used to reconstruct the high-dimensional feature $v_i$ from the low-dimensional embedding $z_i$. Thus, the reconstruction loss module 262*a* or 262*b* can be used to compute a reconstruction loss for the linear decoder, which is defined as:

$$\mathcal{L}_{recon} = \sum_{i=1}^{2b} \|v_i - W_d z_i\|_2^2, \quad \text{Eq. (6)}$$

There are several benefits for training the autoencoder. First, with the optimal linear autoencoder, the subject technology can project $v_i$ into its low-dimensional principal subspace and can be understood as applying principal component analysis (PCA). Thus, the low-dimensional representation $z_i$ is intrinsically robust to input noise. Second, minimizing the reconstruction error is maximizing a lower bound of the mutual information between $v_i$ and $z_i$. Therefore, knowledge learned from the contrastive losses can be maximally preserved in the high-dimensional representation, which helps regularize the classifier.

In one embodiment, the output high-dimensional feature $v_i$, are passed to the classifier 255. Given the softmax output from the classifier 255, $p(y; x_i)$, a classification loss may be defined as the cross-entropy loss. Thus, the cross-entropy loss module 261 may compute the cross-entropy loss as:

$$\mathcal{L}_{ce} = -\Sigma_{i=1}^{b} \log p(y_i; x_i), \quad \text{Eq. (7)}$$

The cross-entropy loss $\mathcal{L}_{ce}$ may be used to update the classifier 255, e.g., via the backpropagation path shown in dashed line from block 261.

In some embodiment, the prototypical contrastive loss, the consistency contrastive loss, the cross-entropy loss and the reconstruction loss may be combined to jointly train the neural network. The combined loss module 280 may then compute an overall training objective, as to minimize a weighted sum of all losses:

$$\mathcal{L} = \mathcal{L}_{ce} + \omega_{cc}\mathcal{L}_{cc} + \omega_{pc}\mathcal{L}_{pc\_mix} + \omega_{recon}\mathcal{L}_{recon}, \quad \text{Eq. (8)}$$

For example, the weight parameters may be set as $\omega_{cc}=1$, $\omega_{recon}=1$, and change $\omega_{pc}$ only across datasets.

Computer Environment

Figure 3:
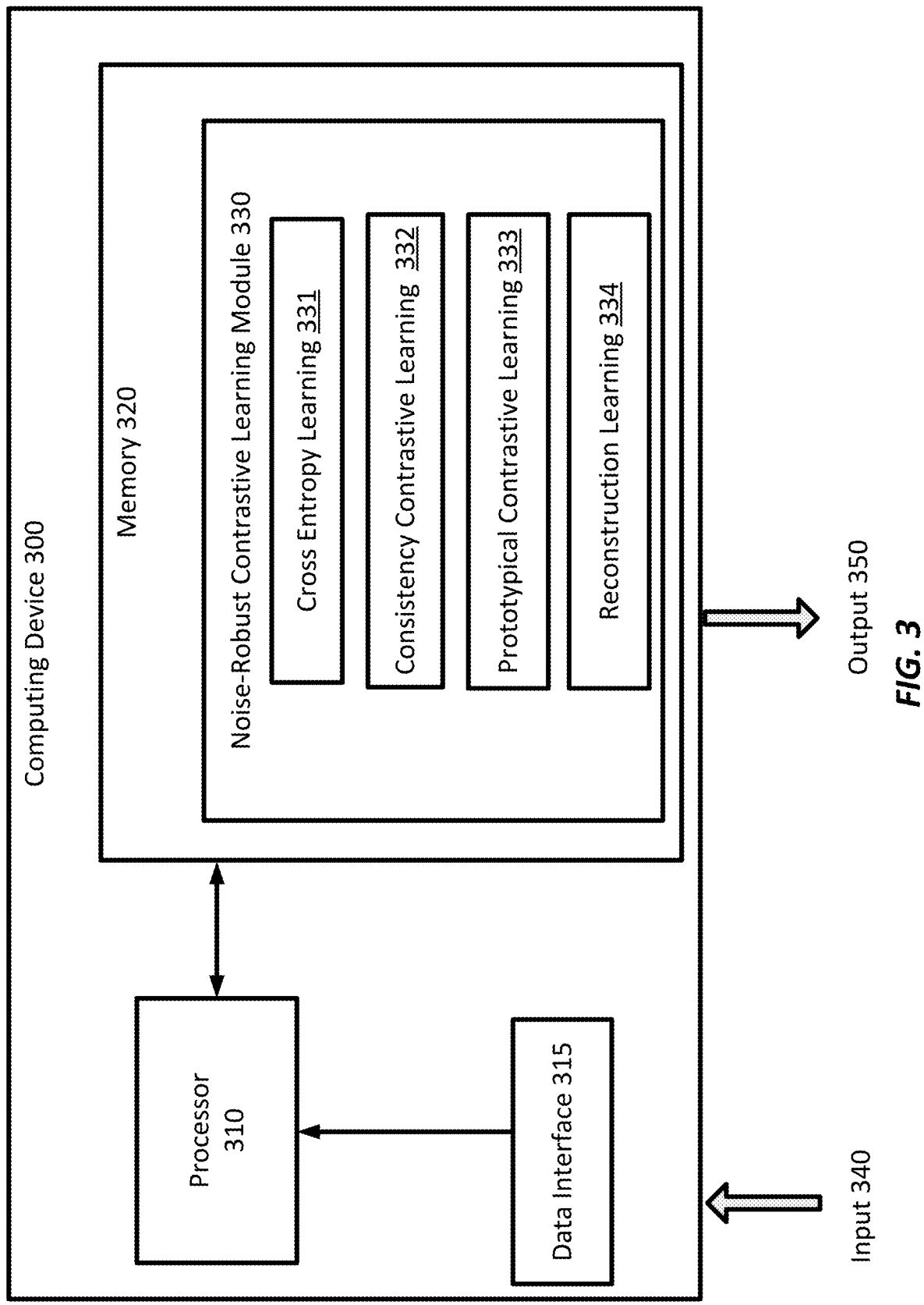
FIG. 3 is a simplified diagram of a computing device for implementing the noise-robust contrastive learning described in FIGS. 1-2, according to some embodiments.

FIG. 3 is a simplified diagram of a computing device for implementing the noise-robust contrastive learning described in FIGS. 1-2, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for a noise-robust contrastive learning module 330 that may be used to implement and/or emulate the systems and models, and/or to implement any of the methods described further herein. In some examples, the noise-robust contrastive learning module 330 may be used to receive and handle the input 340 via a data interface 315. For example, the input 340 may include an image uploaded by a user via a user interface, a dataset of training images received via a communication interface, etc. The noise-robust contrastive learning module 330 may generate an output 350, e.g., such as a class label corresponding to the input image. In some examples, the noise-robust contrastive learning module 330 may also handle the iterative training and/or evaluation of a system or model.

In some embodiments, the noise-robust contrastive learning module 330 may correspond to a neural network model that is evaluated by processor 310. In particular, the noise-robust contrastive learning module 130 may include a plurality of neural network layers. Examples of neural network layers include densely connected layers, convolutional layers, recurrent layers, pooling layers, dropout layers, and/or the like. In some embodiments, the noise-robust contrastive learning module 330 may include at least one hidden layer that is not directly connected to either an input or an output of the neural network. The noise-robust contrastive learning module 330 may further include a plurality of model parameters (e.g., weights and/or biases) that are learned according to a machine learning process. Examples of machine learning processes include supervised learning, reinforcement learning, unsupervised learning, and/or the like.

In some embodiments, the noise-robust contrastive learning module 330 includes a cross entropy learning module 331, a consistency contrastive learning module 332, a prototypical contrastive learning module 333 and a reconstruction learning module 334. For example, the cross-entropy learning module 331 may be configured to compute a cross entropy loss based on a classifier output. The cross entropy learning module 331 may include any combination of, and may perform any functions of the classifier 255, CNNs 245a, and the cross-entropy loss module 261 in FIG. 2.

For another example, the prototypical contrastive learning module 333 may be configured to compute a prototypical contrastive loss based on a class prototype and a normalized embedding of the input 340. The prototypical contrastive learning module 333 may include any combination of, and may perform any functions of the input interpolation 268, CNN 245c, the autoencoder 260c, the prototype computation module 266 and the prototypical contrastive loss module 270.

For another example, the consistency contrastive loss learning module 332 may be configured to compute an instance contrastive loss based on normalized embeddings of weak augmentation and strong augmentation of the input 340. The consistency contrastive loss learning module 332 may include any combination of and may perform any functions of CNN 245a-b, autoencoders 260a-b and the consistency contrastive loss 265.

For another example, the reconstruction loss learning module 334 may be configured to compute a reconstruction loss based on the normalized embedding of the input 340 and the high-dimensional features of the input 340. The reconstruction loss learning module 334 may include any combination of and may perform any functions of a linear decoder that reconstructs the normalized embedding to the high-dimensional features, autoencoders 260a-b, CNNs 245a-b, and the reconstruction loss modules 262a-b.

The modules and/or submodules 331-334 may be operated in parallel, concurrently, alternately, or in other manners. In some examples, the noise-robust contrastive learning module 330 and the sub-modules 331-334 may be implemented using hardware, software, and/or a combination of hardware and software.

Noise-Robust Contrastive Learning Method

FIG. 4 provides an example diagram illustrating pseudo-code of the noise-robust contrastive learning together with label correction as implemented by the neural network 130 in FIG. 1, the architecture 200 in FIG. 2, or the noise-robust contrastive learning module 330 in FIG. 3, according to one embodiment described herein. The pseudo-code in FIG. 4 can be further described by the flow charts in FIGS. 5A-5C and 6.

Figure 5A:
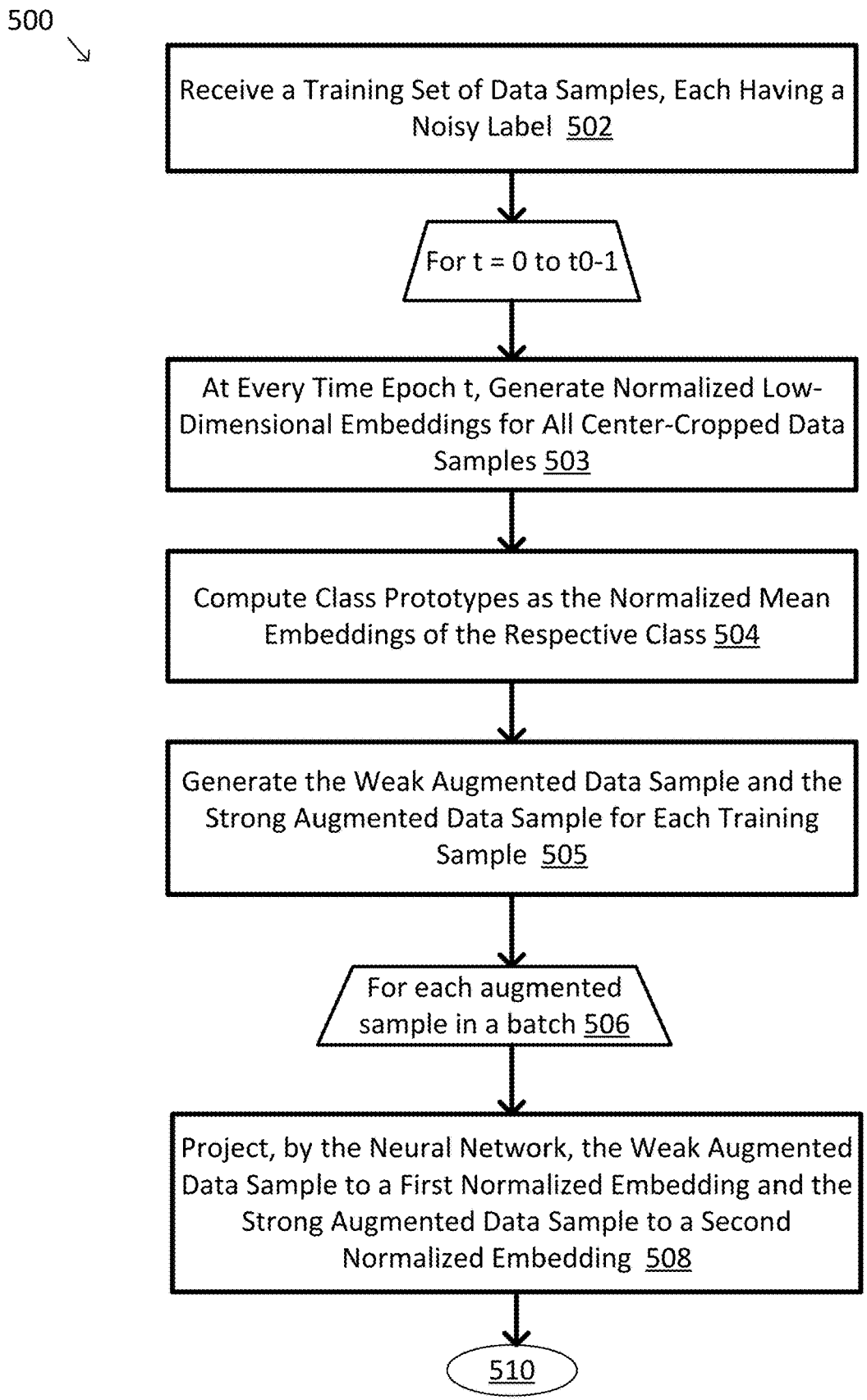
FIGS. 5A-5C provides an example flow diagram illustrating a method of noise-robust contrastive learning that may be similar to the process described by the pseudo-code in FIG. 4, according to one embodiment described herein.
Figure 5B:
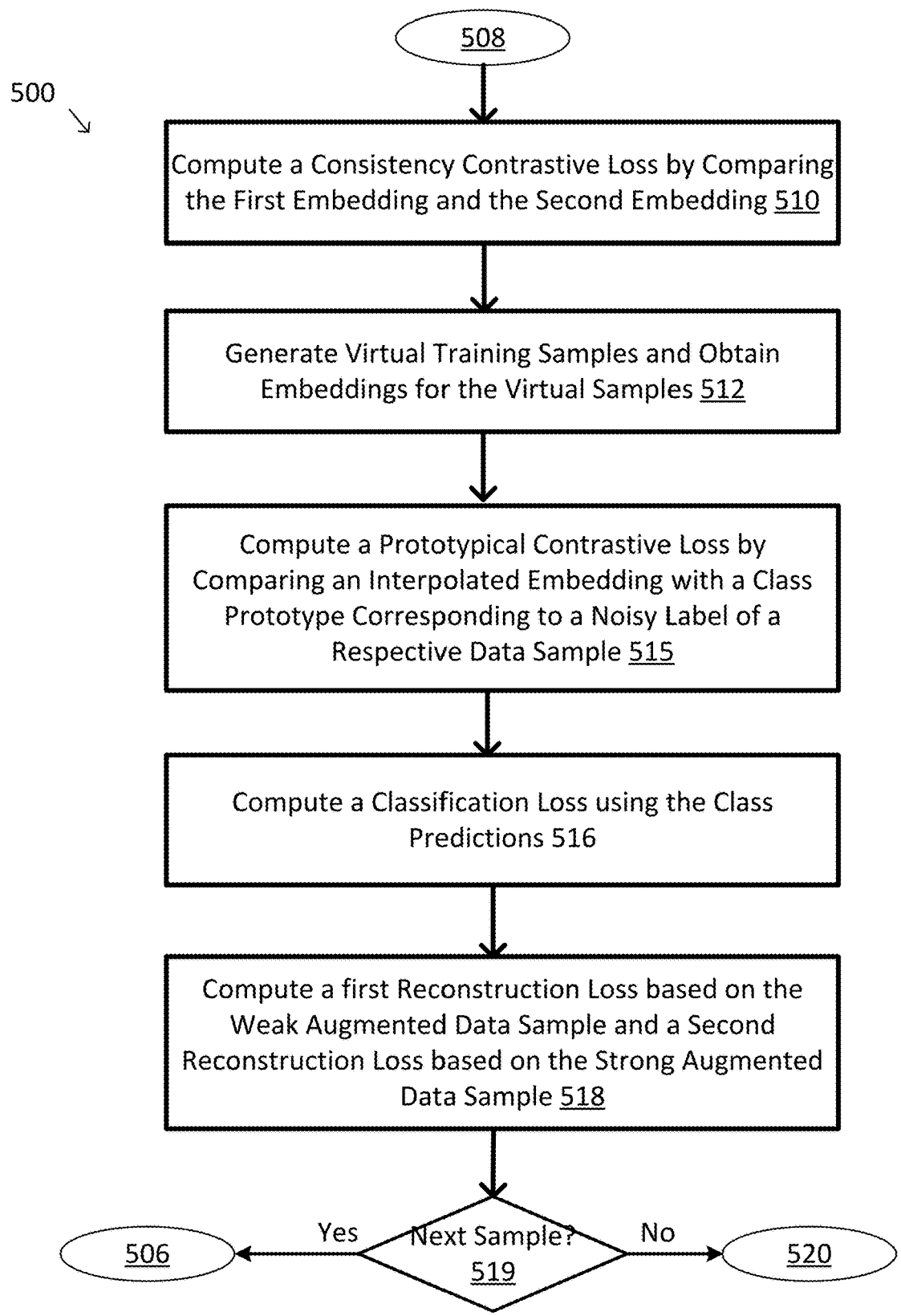
Figure 5C:
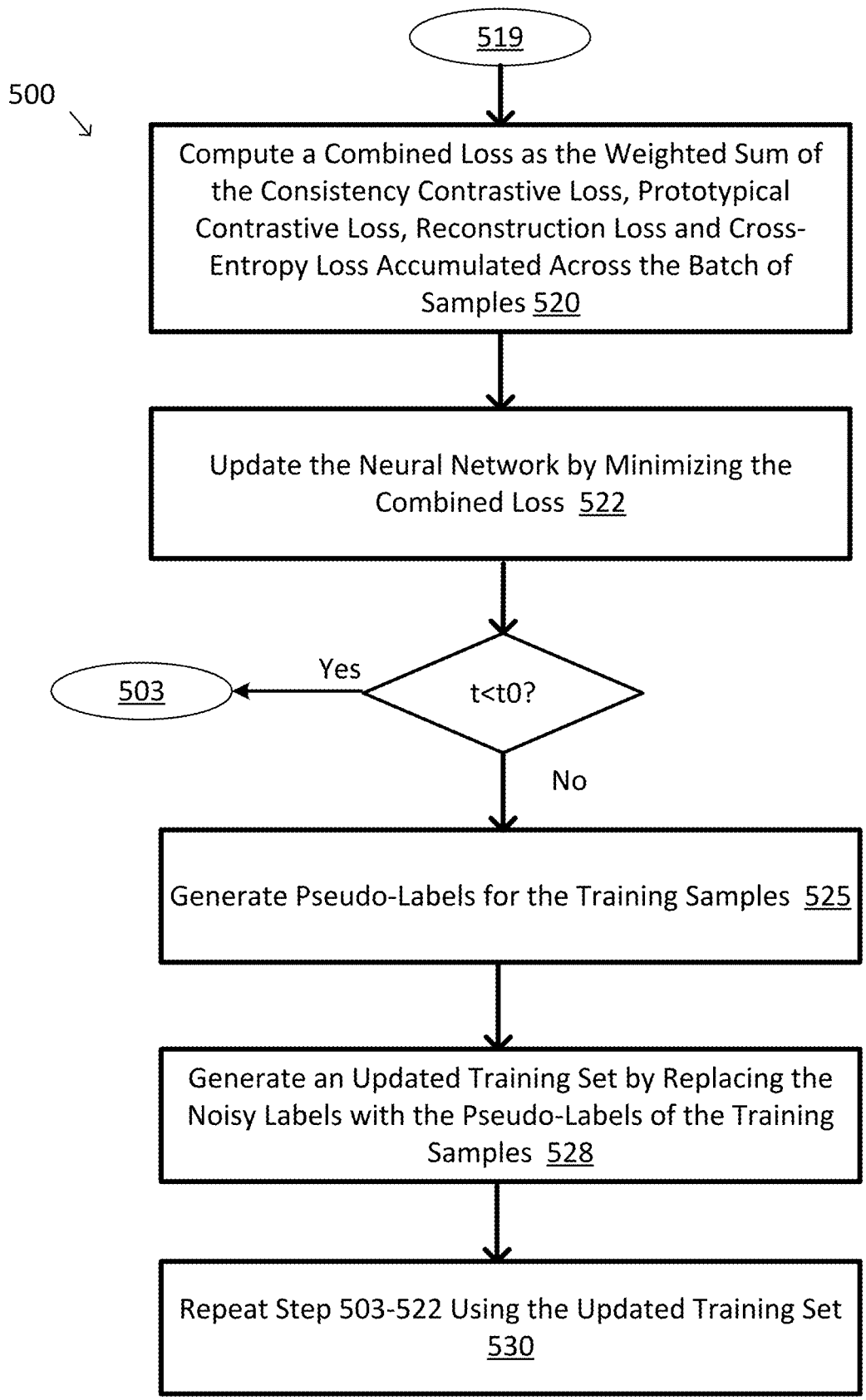

FIGS. 5A-5C provides an example flow diagram illustrating a method of noise-robust contrastive learning that may be similar to the process described by the pseudo-code in FIG. 4, according to one embodiment described herein. One or more of the steps 502-530 of method 500 may be implemented, at least in part, in the form of executable code stored on non-transitory, tangible, machine-readable media that when run by one or more processors may cause the one or more processors to perform one or more of the steps 502-530. In some embodiments, method 500 may correspond to the method used by the noise-robust contrastive learning module 330.

Method 500 starts with step 502, at which a training set of data samples may be obtained, each data sample having a noisy label. For example, the training set of data samples may be received as part of input 340 via the data interface 315 in FIG. 3.

Method 500 may then learn from the noisy labels from the training set for a plurality of time epochs, e.g., as a warm-up stage. For time t from 0 to $t_0-1$, normalized low-dimensional embeddings for all the data samples may be generated at each time epoch, at step 503. For example, the embeddings are generated by CNN 245 and autoencoder 260 shown in FIG. 2 from center-cropped versions of the original image samples.

At step 504, class prototypes can be computed as the normalized mean embeddings of each respective class, e.g., according to Eq. (2). At step 505, for each data sample, a weak augmented data sample (e.g., 241) and a strong augmented data sample may be generated. For example, the original training set may be expanded to $\{(x_i, y_i)\}_{i=1}^{2b}$ with the augmented data samples.

For each augmented sample in the batch $\{(x_i, y_i)\}_{i=1}^{2b}$ at step 506, method 500 proceeds to step 508, where the augmented sample is projected to a normalized embedding by the neural network. For example, in one implementation, the weak augmented sample 241 is projected to a first normalized embedding via CNN 245a and autoencoder 260a, and the strong augmented sample 242 is projected to a second normalized embedding via CNN 245b and autoencoder 260b, in parallel. For another example, the weak augmented sample 241 or the strong augmented sample 242 is projected to the corresponding embedding using CNN 245 and autoencoder 260 sequentially, until all augmented samples in the batch $\{(x_i, y_i)\}_{i=1}^{2b}$ are projected.

At step 510, a consistency contrastive loss is computed by comparing the first embedding generated from the weakly augmented sample 241 and the second embedding generated from the strongly augmented sample 242, e.g., according to Eq. (1).

At step 512, virtual training samples may be generated, e.g., by interpolating samples in the batch to $\{(x_i, y_i)\}_{i=1}^{2b}$, according to Eq. (4), and a normalized embedding is generated using the interpolated sample.

At step 515, a prototypical contrastive loss may be computed by comparing the interpolated embedding with a class prototype corresponding to the noisy labels of the respective data samples, e.g., according to Eqs. (3) and (5).

At step 516, a classification loss may be computed using the class predictions, e.g., generated by the classifier 255. The computation may be done according to Eq. (7).

At step 518, a first reconstruction loss may be computed based on the weakly augmented data sample, and a second reconstruction loss may be computed based on the strongly augmented data sample, e.g., according to Eq. (6).

Method 500 may then determine whether the next sample is to be retrieved from the training batch at step 519. If more samples are to be processed from the training batch, method 500 proceeds to step 506. Otherwise, method 500 proceeds to step 520, where a combined loss is computed by adding the weighted sum of all the losses across the batch of samples, e.g., according to Eq. (8).

At step 522, the neural network may then be updated by minimizing the combined loss.

Method 500 then determined whether the "warm-up" stage has passed, e.g., $t < t_0$. If $t < t_0$, method 500 may continue to learn through pseudo labels at step 503. Otherwise, method 500 proceeds to step 525, where pseudo-labels may be generated for the training samples. Based on the pseudo labels, an updated training set may be generated by replacing the noisy labels with the pseudo labels at step 528. In this way, the neural network may be retrained using the updated training set with pseudo labels at 530, e.g., by repeating steps 503-522 using the updated training set.

Figure 6:
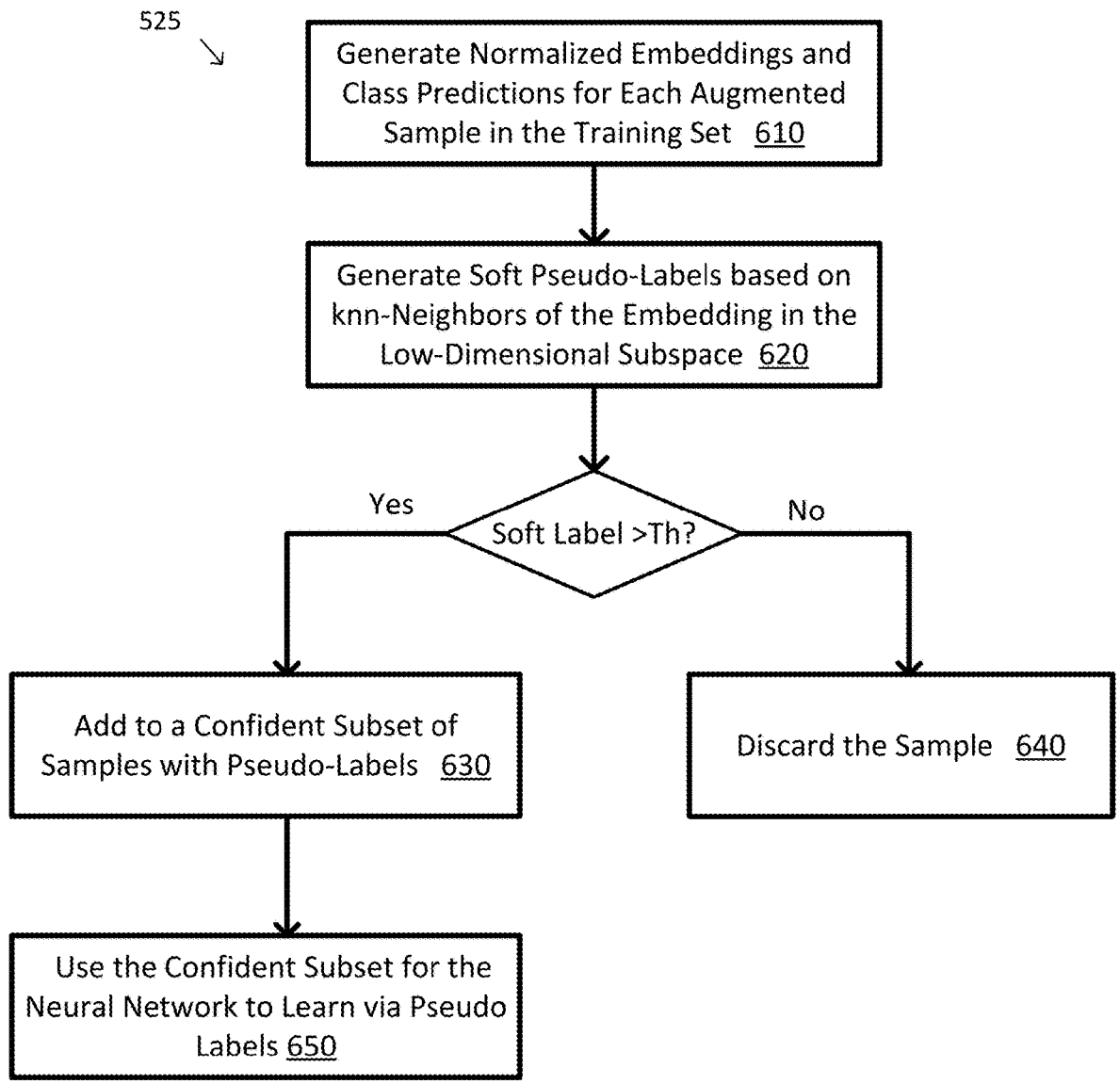
FIG. 6 provides an example flow diagram illustrating a method of generating pseudo labels at step shown in FIG. 5C, according to one embodiment described herein.

FIG. 6 provides an example flow diagram illustrating a method of generating pseudo labels at step 525 shown in FIG. 5C, according to one embodiment described herein. One or more of the steps 610-650 of method 525 may be implemented, at least in part, in the form of executable code stored on non-transitory, tangible, machine-readable media that when run by one or more processors may cause the one or more processors to perform one or more of the steps 610-650. In some embodiments, method 525 may correspond to the method used by the noise-robust contrastive learning module 330.

After warming-up the model by training with the noisy labels $\{y_i\}_{i=1}^n$ for $t_0$ epochs, the label noise may be cleaned by generating a soft pseudo-label $q_i$ for each training sample. In contrast to previous approaches that perform label correction purely based on the model's softmax prediction, method 525 exploits structure of the robust low-dimensional subspace by aggregating information from neighboring samples, which helps alleviate the confirmation bias problem.

At step 610, normalized embeddings and class predictions for each augmented samples in a training batch may be generated. For example, at the t-th epoch (initialized as $t > t_0$), for each sample $x_i$, $p_i^t$, the classifier's softmax prediction may be generated at classifier 255.

At step 620, denoted by $q_i^{t-1}$, the soft label from the previous epoch ($q_i^{t-1} = p_i^{t_0}$), the soft label for a current epoch may be generated as:

$$q_i^t = (p_i^t + s_{knn}(\hat{z}_i^t, \{\hat{z}_j^t, q_j^{t-1}\}_j^k))/2, \qquad \text{Eq. (9)}$$

where $\hat{z}_j^t$ is the normalized embedding, $s_{knn}$ is acquired by aggregating the soft labels from its k nearest-neighbors in the low-dimensional subspace:

The weight is the similarity between embeddings, $\omega_{ij}^t = \exp(\hat{z}_j^t \cdot \hat{z}_j^t / \tau)$. $s_{knn}$ may be normalized with $s_{knn} = s_{knn} / \|s_{knn}\|_1$, such that it sums to 1. In some aspects, the variable k is set to 200 for all implementations. For example, $s_{knn}$ may be computed as:

$$s_{knn}(\hat{z}_j^t, \{\hat{z}_j^t, q_j^{t-1}\}_j^k) = \Sigma_{j=1}^k \omega_{ij}^t q_j^{t-1}, \qquad \text{Eq. (10)}$$

Thus, method 525 compare the soft label with a threshold. An original class label $y_i$ t is considered to be clean if its score in the soft label is higher than a certain threshold $\eta_0$, and the soft label may be set as a one-hot vector in such cases:

$$q_i^t(c) = \begin{cases} 1 & \text{if } c = y_i \\ 0 & \text{otherwise} \end{cases} \text{ if } q_i^t(y_i) > \eta_0, \qquad \text{Eq. (11)}$$

Next, method 525 defines the confidence of a soft label as its maximum score, and add the sample to a confident subset of samples with confidence higher than threshold $\eta$ at step 630. Otherwise, the sample may be discarded at step 640.

At step 650, the soft labels are then converted into hard pseudo-labels by selecting the class with the maximum score, and the confident subset with the hard pseudo-labels are used to train the neural network as described in FIGS. 5A-5C. For example, this confident subset is denoted as the supervised subset $D_{sup}^t$.

$$D_{sup}^t = \{x_i, \hat{y}_i^t = \arg\max q_i^t(c) | \forall \max q_i^t(c) > \eta_1, c \in \{1, \ldots, C\}\}, \qquad \text{Eq. (12)}$$

Given the supervised subset with corrected labels $\hat{y}_i^t$, the classification loss $\mathcal{L}_{ce}$, the prototypical contrastive loss $\mathcal{L}_{pc}$, and the calculation of prototypes $\hat{z}^c$ may be modified, such that they only use samples from $D_{sup}^t$ with $\hat{y}^t$ as the ground-truth class. The unsupervised losses (i.e. $\mathcal{L}_{cc}$ and $\mathcal{L}_{recon}$) can still operate on all training samples.

Example Performance

Figure 7C:
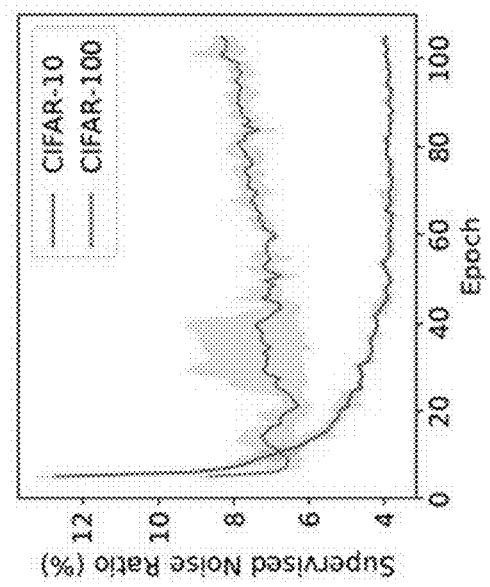
FIGS. 7A-7C illustrate plots of a curriculum learned by the noise-robust contrastive learning module and methods described in FIGS. 1-6, according to some embodiments.
Figure 7B:
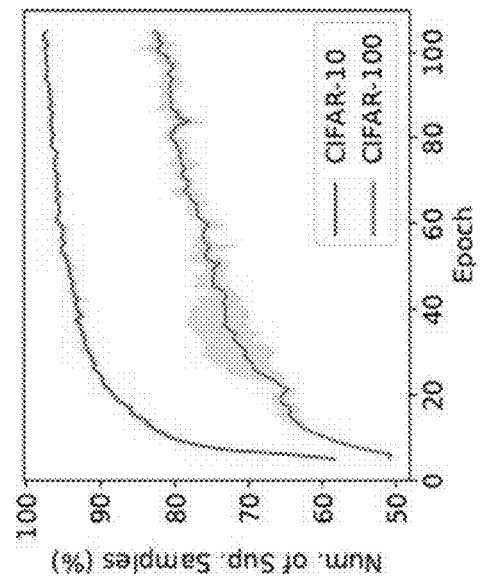
Figure 7A:
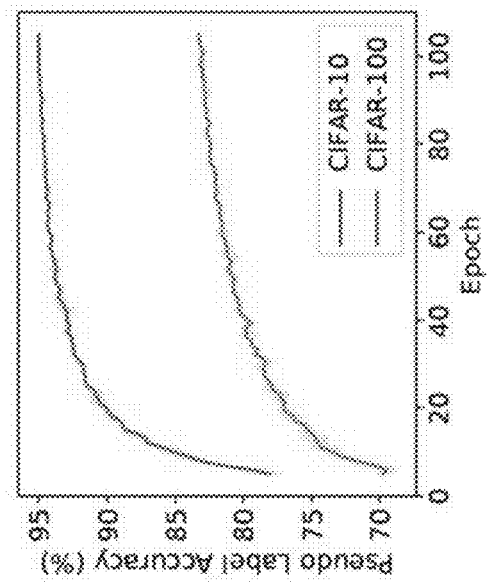

FIGS. 7A-7C illustrate plots of a curriculum learned by the noise-robust contrastive learning module and methods described in FIGS. 1-6, according to some embodiments. The subject technology can utilize the curriculum learned by the label correction process of the subject technology for training on datasets with noise above a certain threshold number of images. To demonstrate such curriculum, the subject technology can analyze the label correction statistics for training the neural network model on CIFAR-10 and CIFAR-100 datasets with 50% label noise. In FIG. 7A, the data plot depicts the accuracy of pseudo-labels with respect to clean training labels. The method effectively cleans most of the label noise. For example, FIG. 7A shows the accuracy of the soft pseudo-labels w.r.t to clean training labels (only used for analysis purpose). The process of the subject technology can significantly reduce the ratio of label noise from 50% to 5% (for CIFAR-10) and 17% (for CIFAR-100). In FIG. 7B, the plot depicts the number of samples in the supervised subset $D_{sup}^t$. As the pseudo-labels become more accurate, more samples are used to compute the supervised losses. For example, FIG. 7B shows the size of $D_{sup}^t$ as a percentage of the total number of training samples. In FIG. 7C, the data plot depicts the label noise ratio in the supervised subset, which maintains a low value even as the subset grows. For example, the data shows the effective label noise ratio within the supervised subset $D_{sup}^t$. The process of the subject technology can maintain a low noise ratio in the supervised subset, while gradually increasing its size to utilize more samples for the supervised losses.

Figures 8, 9, 10:
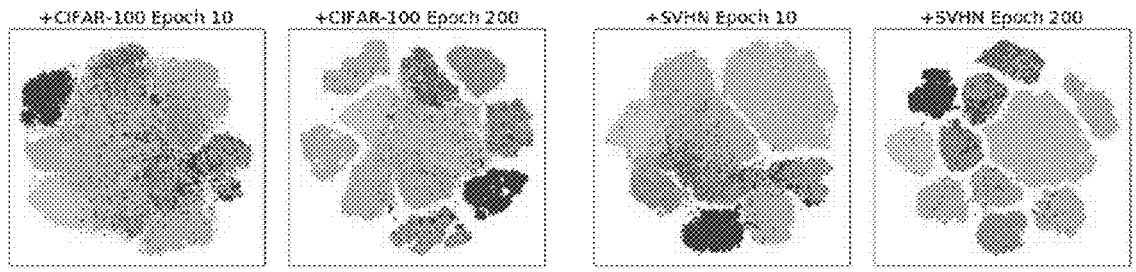
FIG. 8 provide a data table showing example performance with existing methods on CIFAR datasets with controlled label noise, according to one embodiment described herein.
FIG. 9 provides a data table showing example performance with existing methods on CIFAR datasets with controlled label noise and noisy images, according to one embodiment described herein.
FIG. 10 provides example t-SNE visualizations of the low-dimensional embeddings for all training samples, according to one embodiment described herein.

FIG. 8 provide a data table showing example performance with existing methods on CIFAR datasets with controlled label noise, according to one embodiment described herein. For example, the training data of CIFAR-10 and CIFAR-174 are corrupted with two types of label noise: symmetric and asymmetric. Symmetric noise is injected by randomly selecting a percentage of samples and changing their labels to random labels. Asymmetric noise is class-dependant, where labels are only changed to similar classes (e.g. dog↔cat, deer→horse). Multiple noise ratios are experimented, e.g., sym 20%, sym 50%, and asym 40%. Note that asymmetric noise ratio cannot exceed 50% because certain classes would become theoretically indistinguishable.

For implementation, PreAct ResNet-18 is chosen as the encoder model. The dimensionality of the bottleneck layer is set as d=50. The neural network is trained using SGD with a momentum of 0.9, a weight decay of 0.0005, and a batch size of 128. The network is trained for 200 epochs. The initial learning rate is set as 0.02 and use a cosine decay schedule. Standard crop and horizontal flip is used as the weak augmentation. For strong augmentation, AugMix or SimAug operations are used. For all CIFAR experiments, the hyper-parameters are $\omega_{cc}=1$, $\omega_{pc}=5$, $\omega_{recon}=1$, $\tau=0.3$, $\alpha=8$, $\eta 1=0.9$. For CIFAR-10, label correction is activated at epoch $t_0=5$, and set $\eta 0=0.1$. For CIFAR-100, label correction is activated at epoch $t_0=15$, and set $\eta 0=0.02$.

FIG. 0.8 shows the comparison with existing methods. The noise-robust contrastive learning method described herein outperforms previous methods across all label noise settings. On the more challenging CIFAR-100, the method described herein achieves 3-4% accuracy improvement compared to the second-best method DivideMix. Moreover, the method described herein is twice more computational efficient than DivideMix, which needs co-training for noise filtering.

In order to demonstrate the advantage of the proposed low-dimensional embeddings, k-nearest neighbor (knn) classification (k=200) is applied, by projecting test images into normalized embeddings. Compared to the trained classifier, knn achieves better higher accuracy, which verifies the robustness 196 of the learned low-dimensional representations.

FIG. 9 provides a data table showing example performance with existing methods on CIFAR datasets with controlled label noise and noisy images, according to one embodiment described herein. A CIFAR-10 dataset is corrupted with label noise (sym. 50%) by injecting two 199 types of input noise: out-of-distribution (OOD) images and input corruption. For OOD noise, 20 k images are added from either one of the two other datasets: CIFAR-100 and SVHN enlarging the training set to 70 k. A random CIFAR-10 label is assigned to each OOD image. For input corruption, each image is corrupted in CIFAR-10 with a noise randomly chosen from the following four types: Fog, Snow, Motion blur and Gaussian noise. implementation is similar to that described in relation to FIG. 8.

FIG. 9 shows the results, where the proposed method consistently outperforms existing methods by 2a substantial margin. OOD images from a similar domain (CIFAR-100) are more harmful than OOD images from a more different domain (SVHN). This is because noisy images that are closer to the test data distribution are more likely to distort the decision boundary in a way that negatively affects test performance. Nevertheless, performing knn classification using the learned embeddings demonstrates high robustness to input noise.

FIG. 10 provides example t-SNE visualizations of the low-dimensional embeddings for all training samples, according to one embodiment described herein. As training progresses, the neural network learns to separate OOD samples from in-distribution samples, and cluster samples of the same class despite their noisy labels, as illustrated by the separated cloud clusters.

FIGS. 11-12 provide data tables showing example performance with existing methods real-world noisy data, according to one embodiment described herein, according to one embodiment described herein. Two real-word noisy datasets: WebVision and Clothing1M are used. Webvision contains images crawled from the web using the same concepts from ImageNet ILSVRC12. Experiments is performed on the first 50 classes of the Google image subset. Clothing1M consists of images collected from online shopping websites where labels were generated from surrounding texts. Note that additional clean set is not used for training. For both experiments, the same model architecture similar to FIG. 2 is used.

The results for WebVision in shown in FIG. 11 and the results for Clothing1M in FIG. 12. The proposed method achieves superior performance on both datasets, with more than 2× speed-up compared to the second best method. In FIG. 11, our method achieves competitive performance even without performing label correction, which demonstrates the robustness of the learned representation.

FIGS. 13-14 provide data tables showing example ablation study, according to one embodiment described herein. For example, the reconstruction loss $L_{recon}$ is removed to study the effect of the auto-encoder. As shown in FIG. 13, test performance decrease across multiple benchmarks. This verifies the effect of the auto-encoder for mapping the high-dimensional representation to its principal subspace, and grounding the structure learned in the low-dimensional subspace back to the high-dimensional feature space.

In addition, the dimensionality of the bottleneck layer, d, is varied to examine the performance change in FIG. 14. The proposed neural model is in general not very sensitive to the change of d.

It is to be noted that embodiments described herein relate to learning from noisy data especially for computer vision. Deep neural network models are effectively trained, via the proposed methods and/or structures described in FIGS. 1-6 using the enormous amount of weakly-labeled images that are freely-available on the Web. Therefore, AI systems could be build without relying on human annotation, which greatly reduces the financial cost. However, training deep models puts heavy requirements on computation resource, which is a common issue faced by the deep learning community. The proposed method also improves the computational efficiency compared to many existing methods.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for training a neural network model for object identification in images, comprising:
    a communication interface configured to receive a training dataset comprising a set of image samples, each image sample having a noisy label that belongs to a plurality of classes;
    a non-transitory memory storing the neural network model including an encoder, a first copy of the encoder, a second copy of the encoder, a classifier, an autoencoder and a first copy of the autoencoder both coupled to the classifier, a second copy of the autoencoder and processor-executable instructions; and
    one or more hardware processors coupled to the non-transitory memory and configured to read instructions from the non-transitory memory to cause the system to perform operations comprising:
    generating, for each image sample of the set of image samples, a first augmented image sample by modifying a first amount of the respective image sample, a second augmented image sample by modifying a second different amount of the same respective image sample, and an interpolated image sample by taking a linear interpolation, the first augmented image sample, the second augmented image sample and the interpolated image sample corresponding to a same original image sample;
    encoding, the first augmented image sample by the encoder of the neural network model, the second augmented image sample by a first copy of the encoder and the interpolated image sample by a second copy of the encoder operated in parallel to the encoder into a first high-dimensional feature representation, a second high-dimensional feature representation, and a third high-dimensional feature representation, respectively;
    projecting, respectively by the autoencoder, a first copy of the autoencoder and a second copy of the autoencoder operated in parallel, the first high-dimensional feature representation, the second high-dimensional feature representation, and the third high-dimensional feature representation to a first embedding, a second embedding, and a third embedding that are normalized in a low-dimensional embedding space;

reconstructing, respectively by the autoencoder, the first copy of the autoencoder and the second copy of the autoencoder, the first high-dimensional feature representation based on the first embedding, the second high-dimensional feature representation based on the second embedding, and the third high-dimensional feature representation based on the third embedding;

generating, by the classifier, classification probabilities based on the first high-dimensional feature representation and the second high-dimensional feature representation;

computing a cross-entropy loss based on the classification probabilities;

computing a consistency contrastive loss based on a positive pair of the first embedding and the second embedding and one or more negative pair of embeddings projected from augmented image samples that do not correspond to a same original image sample;

computing for each class of the plurality of classes, a respective class prototype as a normalized mean embedding over image samples that belong to the respective class in the training dataset;

computing a prototypical contrastive loss based on a weighted combination of a comparison between the first embedding and the third embedding and a comparison between the second embedding and the third embedding;

computing a reconstruction loss based on a first reconstruction loss and a second reconstruction loss, wherein the first reconstruction loss is calculated based on the first embedding and the reconstructed first high-dimensional feature representation, and the second reconstruction loss is calculated based on the second embedding and the reconstructed second high-dimensional feature representation;

computing a combined loss based on a weighted sum of the cross-entropy loss, the instance contrastive loss, the prototypical contrastive loss and the reconstruction loss;

training the neural network model by minimizing the combined loss; and predicting, by the trained neural network model, a class label for object identification in an input image.

2. The system of claim 1, wherein the operations further comprise:
generating embeddings and softmax predictions for all augmented image samples from the training dataset;
generating a soft pseudo label for each image sample based on the softmax predictions and aggregated information from neighboring embeddings of a respective normalized embedding of the respective image sample in the low-dimensional subspace.

3. The system of claim 2, wherein the operations further comprise:
converting all generated soft pseudo label to hard pseudo labels by applying a first threshold;
selecting a confident subset with confident soft labels having softmax predictions greater than a second threshold.

4. The system of claim 1, wherein the training of the neural network model further comprise:
training the neural network model using the received training dataset with noisy labels for a first plurality of time epochs;

generating a confident subset of the training dataset with pseudo labels using the trained neural network model; and continuing training the neural network model using the confident subset with pseudo labels for a second plurality of time epochs.

5. The system of claim 1, wherein class prototype is computed based on a normalized embedding of a center-cropped image sample that belongs to the respective class in the training dataset.

6. A method for noise-robust contrastive learning for training a neural network model for object identification in images, the method comprising:

receiving, via a communication interface, a training dataset comprising a set of image samples, each image sample having a noisy label that belongs to a plurality of classes;

retrieving, from a non-transitory memory, a neural network model including an encoder, a first copy of the encoder, a second copy of the encoder, a classifier, an autoencoder and a first copy of the autoencoder both coupled to the classifier, and a second copy of the autoencoder;

generating, by a processor, for each image sample of the set of image samples, a first augmented image sample by modifying a first amount of the respective image sample, a second augmented image sample by modifying a second different amount of the same respective image sample, and an interpolated image sample by taking a linear interpolation, the first augmented image sample, the second augmented image sample and the interpolated image sample corresponding to a same original image sample;

encoding, the first augmented image sample by the encoder of the neural network model, the second augmented image sample by a first copy of the encoder and the interpolated image sample by a second copy of the encoder operated in parallel to the encoder into a first high-dimensional feature representation, a second high-dimensional feature representation, and a third high-dimensional feature representation, respectively;

projecting, respectively by the autoencoder, a first copy of the autoencoder and a second copy of the autoencoder operated in parallel, the first high-dimensional feature representation, the second high-dimensional feature representation, and the third high-dimensional feature representation to a first embedding, a second embedding, and a third embedding that are normalized in a low-dimensional embedding space;

reconstructing, respectively by the autoencoder, the first copy of the autoencoder and the second copy of the autoencoder, the first high-dimensional feature representation based on the first embedding, the second high-dimensional feature representation based on the second embedding, and the third high-dimensional feature representation based on the third embedding;

generating, by the classifier, classification probabilities based on the first high-dimensional feature representation and the second high-dimensional feature representation;

computing a cross-entropy loss based on the classification probabilities;

computing a consistency contrastive loss based on a positive pair of the first embedding and the second embedding and one or more negative pair of embeddings projected from augmented image samples that do not correspond to a same original image sample;

computing, for each class of the plurality of classes, a respective class prototype as a normalized mean embedding over image samples that belong to the respective class in the training dataset;

computing a prototypical contrastive loss based on a weighted combination of a comparison between the first embedding and the third embedding and a comparison between the second embedding and the third embedding;

computing a reconstruction loss based on a first reconstruction loss and a second reconstruction loss, wherein the first reconstruction loss is calculated based on the first embedding and the reconstructed first high-dimensional feature representation, and the second reconstruction loss is calculated based on the second embedding and the reconstructed second high-dimensional feature representation;

computing a combined loss based on a weighted sum of the cross-entropy loss, the instance contrastive loss, the prototypical contrastive loss and the reconstruction loss;

training the neural network model by minimizing the combined loss; and predicting, by the trained neural network model, a class label for object identification in an input image.

7. The method of claim 6, further comprising:

generating embeddings and softmax predictions for all augmented image samples from the training dataset;

generating a soft pseudo label for each image sample based on the softmax predictions and aggregated information from neighboring embeddings of a respective normalized embedding of the respective image sample in the low-dimensional subspace.

8. The method of claim 7, further comprising:

converting all generated soft pseudo label to hard pseudo labels by applying a first threshold;

selecting a confident subset with confident soft labels having softmax predictions greater than a second threshold.

9. The method of claim 6, wherein the training of the neural network model further comprises:

training the neural network model using the received training dataset with noisy labels for a first plurality of time epochs;

generating a confident subset of the training dataset with pseudo labels using the trained neural network model; and continuing training the neural network model using the confident subset with pseudo labels for a second plurality of time epochs.

10. A non-transitory processor-readable memory storing processor-executable instructions for noise-robust contrastive learning for training a neural network model for object identification in images, the neural network model comprising an encoder, a first copy of the encoder, a second copy of the encoder, a classifier, an autoencoder and a first copy of the autoencoder both coupled to the classifier, and a second copy of the autoencoder, the instructions being executed by one or more hardware processors perform operations comprising:

receiving, via a communication interface, a training dataset comprising a set of image samples, each image sample having a noisy label that belongs to a plurality of classes;

generating, for each image sample of the set of image samples, a first augmented image sample by modifying a first amount of the respective image sample, a second augmented image sample by modifying a second different amount of the same respective image sample, and an interpolated image sample by taking a linear interpolation, the first augmented image sample, the second augmented image sample and the interpolated image sample corresponding to a same original image sample;

encoding, the first augmented image sample by the encoder of the neural network model, the second augmented image sample by a first copy of the encoder and the interpolated image sample by a second copy of the encoder operated in parallel to the encoder into a first high-dimensional feature representation, a second high-dimensional feature representation, and a third high-dimensional feature representation, respectively;

projecting, respectively by the autoencoder, a first copy of the autoencoder and a second copy of the autoencoder operated in parallel, the first high-dimensional feature representation, the second high-dimensional feature representation, and the third high-dimensional feature representation to a first embedding, a second embedding, and a third embedding that are normalized in a low-dimensional embedding space;

reconstructing, respectively by the autoencoder, the first copy of the autoencoder and the second copy of the autoencoder, the first high-dimensional feature representation based on the first embedding, the second high-dimensional feature representation based on the second embedding, and the third high-dimensional feature representation based on the third embedding;

generating, by the classifier, classification probabilities based on the first high-dimensional feature representation and the second high-dimensional feature representation;

computing a cross-entropy loss based on the classification probabilities;

computing a consistency contrastive loss based on a positive pair of the first embedding and the second embedding and one or more negative pair of embeddings projected from augmented image samples that do not correspond to a same original image sample;

computing for each class of the plurality of classes, a respective class prototype as a normalized mean embedding over image samples that belong to the respective class in the training dataset;

computing a prototypical contrastive loss based on a weighted combination of a comparison between the first embedding and the third embedding and a comparison between the second embedding and the third embedding;

computing a reconstruction loss based on a first reconstruction loss and a second reconstruction loss, wherein the first reconstruction loss is calculated based on the first embedding and the reconstructed first high-dimensional feature representation, and the second reconstruction loss is calculated based on the second embedding and the reconstructed second high-dimensional feature representation;

computing a combined loss based on a weighted sum of the cross-entropy loss, the instance contrastive loss, the prototypical contrastive loss and the reconstruction loss;

training the neural network model by minimizing the combined loss; and predicting, by the trained neural network model, a class label for object identification in an input image.

* * * * *